INVENTOR.
ANSGAR HANSEN
BY Hamilton & Cook
ATTORNEYS

INVENTOR.
ANSGAR HANSEN
BY Hamilton & Cook
ATTORNEYS

United States Patent Office 3,412,343
Patented Nov. 19, 1968

3,412,343
NETWORK STABILIZATION FOR FEEDBACK CONTROL AMPLIFIERS
Ansgar Hansen, Akron, Ohio, assignor to The Imperial Electric Company, Akron, Ohio, a corporation of Ohio
Filed Mar. 31, 1966, Ser. No. 539,052
6 Claims. (Cl. 330—103)

ABSTRACT OF THE DISCLOSURE

A feedback control system for stabilizing an amplifier network. The output voltage to a load from an input power source is controlled by tapping off a proportion of the output voltage and feeding it back through a negative feedback network to a summation box for a control amplifier network. The control network is shunted by a non-linear branch network which provides operational stability while ensuring rapid response.

---

The present invention relates generally to closed loop servomechanism systems. More particularly, the present invention relates to a feedback control system having a minor feedback loop for stabilization of the operation and response of the system. More specifically, the invention relates to branch network stabilization circuitry for a feedback control amplifier for correlating and controlling the excitation of an electrical A.C. generator system with non-linear components in rapid response in at least one direction to fluctuations in rectified D.C. output voltage to a load.

The achievement in a feedback control system of the proper combination of performance criteria in terms of stability of operation and speed of response presents dynamic or transient problems requiring analysis of, and compensation for, a variety of factors inherent in the system components. For example, in one embodiment of the system of the invention as hereinafter described in detail, factors to be considered include the electronic amplifier transconductances and time constants, the generator transient and subtransient reactances and field and armature time constants, armature self inductance, armature moment of inertia and frictional constants, self, mutual, and leakage inductances of the transformers for the output rectifiers, and the time constant for the rectifier filters. Such factors or intrinsic limitations in preformance characteristics determine the phasor ratios and transfer functions for the various components of the system.

If all of the system components are linear, the problem is not too complex. It is possible to attain stability of operation in such a system by employing cascaded components having phasor ratio and transfer characteristics effecting a net cancellation or matching nullification for the system in accordance with Heaviside's theorem. Conversely, rapid response performance may be obtained through utilization of a minimum number of components having minimal time constant or delay factors.

However, if some of the system components exhibit or experience non-linear operation characteristics, stability is often then difficult to achieve. For example, the generator-rectifier application described herein is essentially linear in operation or characteristics under loaded conditions; but, under conditions of no load or light load, the system is non-linear.

In the past, it has therefore been the practice to effect a compromise between stability and response criteria in the design and selection of components of feedback systems with non-linear components. The empirical compromises thus employed have inevitably imposed limitations upon system response.

It is therefore an object of the present invention to provide an improved closed loop servomechanism or feedback control system having optimum speed of response and stability of operation and alleviating or substantially eliminating the aforesaid problems in systems employing non-linear components.

It is a further object of the invention to furnish a novel branch stabilization network providing operational stability for a system demanding fast response to signals in one direction but allowing slower response for signals in the other direction.

It is a still further object of the invention to provide a unique non-linear branch stabilization network or minor feedback loop having parameters adapted to optimize stability and rate of response.

It is another object of the invention to provide such an improved stabilizing network in which compensation and attenuation delay factors are minimized.

It is yet another object to provide an improved feedback control system for accurately correlating and controlling the excitation of an electrical generator in rapid response to fluctuations in output voltage to a load.

These and other objects and advantages of the present invention will become apparent upon reference to the detailed description in the following specification in conjunction with the illustration in the accompanying drawings of one preferred embodiment, it being understood that the invention is to be measured solely by the scope of the appended claims.

While the system described herein in detail employs electrical and electronic components to control rectified output voltage to a load, it will be appreciated by those skilled in the art that the principles of the invention may be applied with equal facility to other servomechanisms in general, including electro-mechanical or mechanical closed loop control systems which constitute equivalents or analogs of the present system.

In general, the invention pertains to a feedback system for controlling output voltage to a load from a power source, such as a generator and rectifier combination, the system including an error signal control amplifier shunted by a novel non-linear branch network or minor feedback loop providing operational stability while ensuring rapid response.

Figure 1:
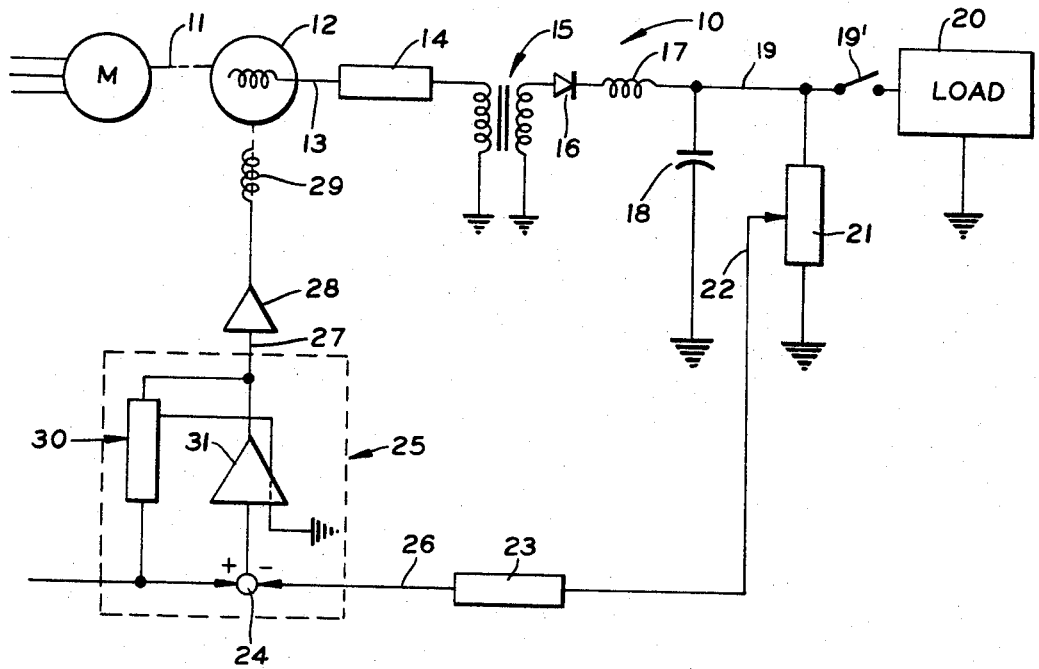
FIG. 1 is a schematic one-line diagram of a closed loop servomechanism or feedback control system according to an exemplary embodiment of the present invention.

Referring to FIG. 1, with no load or light load such a system is non-linear due to the retifier if the response of the regulating system is so prompt or rapid that the transformer voltage, during reference voltage changes or transient load changes, can decrease faster than the voltage on a load filter capacitor 18 hereinafter more fully described. The system according to one preferred form of the invention is designated genenrally by the numeral 10. A three phase A.C. motor M or other prime mover of substantially constant speed is mechanically coupled or connected, as schematically indicated by chain line 11, to the armature of a three phase A.C. generator 12 for rotation thereof. Armature leads 13, shown in schematic one-line diagram style, are each connected through a parameter 14, representing the impedance in the A.C. lines, to a primary winding of a transformer 15, the secondary winding of which is connected to a power rectifier 16 for rectification of the generated A.C. power. The generator, transformer, and rectifier, of course, can be single-phase or multi-phase, FIG. 1 merely representing a generalized one-line diagram.

The D.C. output of rectifier 16 is fed to a half-Pi filter consisting of an inductor 17 and a capacitor 18, the latter connected to ground on one side. The filter is employed to decrease the ripple factor in the rectified D.C. voltage output; and variations of T and Pi filters may be utilized, such variations being susceptible of network transformation or resolution analysis techniques into the generalized half-Pi form illustrated.

The junction of inductor 17 and capacitor 18 is connected to a D.C. output load lead 19 connected through switch 19' to a load 20. A bleeder resistor 21 of relatively large resistance is connected between lead 19 and ground, and the values of inductance capacitance, and resistance for inductor 17, capacitor 18, and resistor 21, repsectively, are such that the overall time constant for the filter and bleeder combination is relatively large in comparison to the desired response time for increasing reference signals or increasing load.

A sample or proportion of the D.C. output voltage thus appearing across bleeder resistor 21 is tapped off by lead 22 and is continuously fed back through an inverse, negative, or degenerative feedback network 23 to a summation box or error indicator node 24 for a control amplifier network, designated and delimited generally by dashed lines 25, as a negative error signal on lead 26.

The control amplifier network 25 continuously transmits an amplified and stabilized signal, corresponding to the error signal superimposed on a reference signal, through lead 27 to the gating, triggering, base, or control grid connection of a power amplifier 28, such as a silicon controlled rectifier, thyratron, or other suitable amplifier circuit for controlling the excitation power to the field 29 of the A.C. generator 12.

As seen in FIG. 1, the control amplifier network 25 comprises a minor feedback loop or branch network, indicated generally by the numeral 30, shunting or paralleling a control amplifier 31. Amplifier 31 is preferably a reversible high gain differential amplifier and should be transistorized for added stability. A common ground is carried through the amplifier 31, and its input is connected to the summation box or error indicator node 24 into which a positive reference signal 33 may be supplied.

Figure 2:
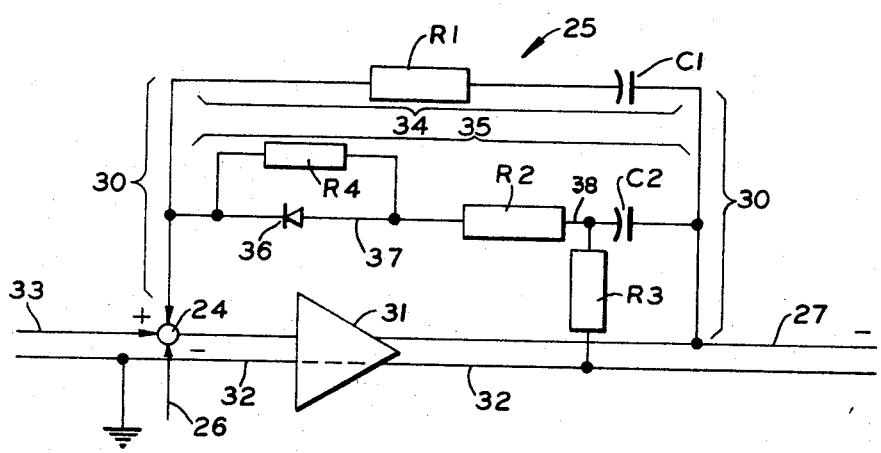
FIG. 2 is a partially schematic diagram depicting in greater detail the branch network portion of the system enclosed in dashed lines in FIG. 1.

Referring particularly to FIG. 2, the minor feedback loop or branch network 30 includes a fast response stabilizing branch circuit 34 consisting of a series-connected first resistor R1 and first capacitor C1 connected in parallel or across the amplifier 31 to the output lead 27 and the summation box or error indicator node 24.

Minor feedback loop 30 is further equipped with a second branch circuit 35 generally connected across the amplifier 31. Branch circuit 35 includes a blocking diode 36 having one side connected to the summation box or error indicator node 24, and the other side to a lead 37. A second resistor R2 has one side connected to lead 37, and the other side to a lead 38. A third resistor R3 is connected between lead 38 and ground 32, and a second capacitor C2 is connected between lead 38 and amplifier output lead 27.

A large resistance fourth resistor R4, shunting blocking diode 36 or other unidirectional signal transmitting device or component, is also preferably provided so as to soften or mitigate slightly the non-linear action of the subsystem 30.

The values of the components R2, R3, and C2 are balanced such that, for signals tending to decrease the output voltage, the consequential conduction of current by the diode 36 and the components renders the response of the system comparatively slow. Conversely, for signals increasing the output voltage, the diode will prevent current from flowing in branch circuit 35. Thus, the response rate is determined substantially by the action of the fast response branch circuit 34. The purpose of resistor R3 is to permit restoration of the charge on capacitor C2 reasonably soon after the appearance of increasing input signals at the summation box or error indicator node 24.

In one actual embodiment of a preferred form of the invention, for example, the relative magnitudes of the resistance parameters R1:R2:R3:R4 was approximately on the order of 15:1:7:1000; and the capacitance of capacitor C2 was approximately twenty times that of capacitor C1. In other actual embodiments, it has been found that the time constant product of C2 times R2 should be on the order of a range of two to five times the magnitude of the product of R1 and C1.

Figure 3:
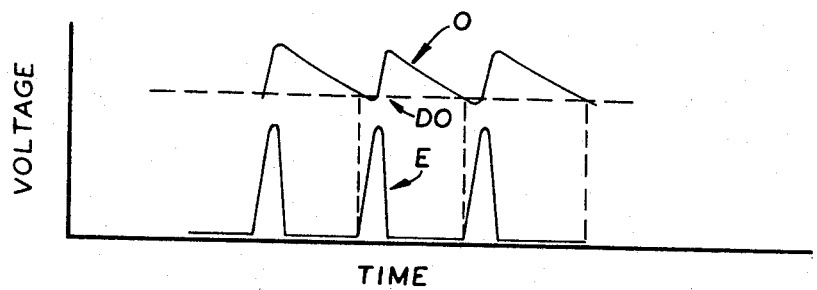
FIG. 3 is a diagram of voltage against time with graphs of output and excitation voltages typical for an unstable system with non-linear components.

If one attempts to achieve fast response, without the system of the present invention, for load pick-up, the performance would be acceptable for static or load conditions (i.e., essentially linear operation); but the system would not perform satisfactorily for no-load or light-load conditions and would instead, produce the hunting, oscillating, or overshooting response of FIG. 3.

Referring to FIG. 3, graphs of typical performance characteristics for such attempts which sought to attain desired rates of rapid response are presented, with distances along the ordinate corresponding to voltage and those along the abscissa representing time. The upper graph O represents load output voltage; while the lower graph E displays generator excitation voltage. As readily seen from the graphs, upon removal of the load, the output voltage sharply increased and then exponentially decayed to the desired output voltage level DO thus producing a generally sawtooth wave; while, the excitation voltage E experienced corresponding periodic spike surges. Such hunting, oscillation, and instability, together with the intrinsic decay delay in response, renders such systems inadequate for modern and critical applications requiring recision performance and sensitivity. While it is possible to further stabilize such unsuccessful or inoperative systems, as by employing compensation techniques, this is achieved only by incurring unacceptable further sacrifices in terms of speed of response.

Figure 4:
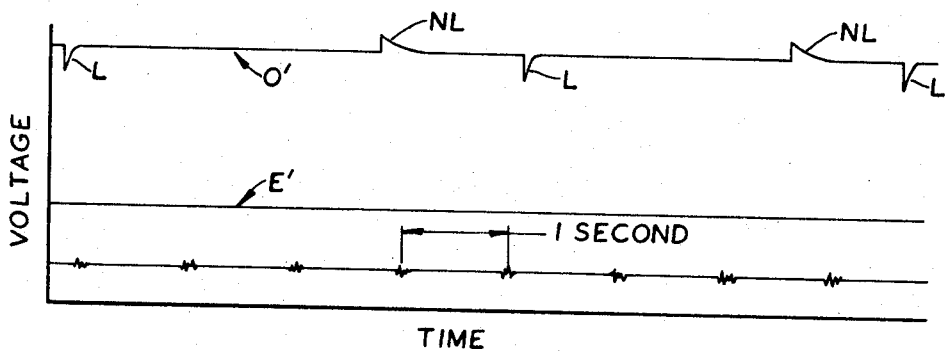
FIG. 4 is a similar diagram illustrating the performance characteristics of a system according to the present invention, the system being fast in picking up a load but relatively slow in dropping the load.

FIG. 4 is a voltage-time plot, on substantially the same relative scale as FIG. 3, corresponding to an actual oscillograph of performance of the above-described preferred embodiment of the invention. The load output voltage graph or trace is labeled O'; and the reference voltage graph is E'. Load switching or connection points are designated L; and load dropping points are signified by NL.

As readily understood from the graphs, response to load-on (L) is quite rapid; while load-off response (NL) is comparatively slow. Yet, the overall system response charactersistic is quite stable.

Figure 5:
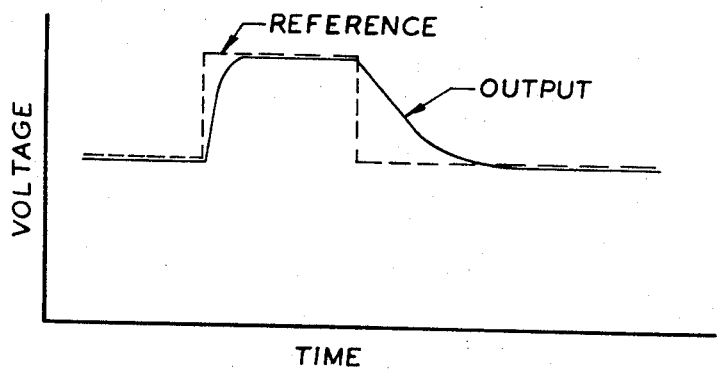
FIG. 5 is a similar diagram displaying the performance of the present system for step changes in reference voltage.

FIG. 5, a voltage-time plot on substantially the same scale as in FIGS. 3 and 4, shows the response of the system according to the present invention for step changes in reference voltage.

It should therefore be apparent that the above-described preferred embodiment of one form of improved stabilizing network for a closed loop servomechanism or feedback control system accomplishes the several objects of the invention.

What is claimed is:
1. In a feedback control system having a control amplifier means with a signal summation input means and a ground means and an output means, a non-linear minor feedback loop comprising; a blocking diode means having one side thereof connected to said input means; a first resistor having one side thereof connected to the other side of said diode means; a first capacitor connected between the other side of said first resistor and said output means; a second resistor connected between said ground means and said other side of said first resistor; and a series connected branch of a third resistor and a second capacitor connected to said input means and to said output means and across said amplifier means.

2. In a feedback control system, according to claim 9, said minor feedback loop further comprising: a large resistance fourth resistor shunting said blocking diode means to soften the non-linear action of said system.

3. In a feedback control system, according to claim 1, wherein said third resistor and second capacitor produce a relatively small response time constant by comparison with the larger time constant of said first resistor and first capacitor, said larger time constant being at least two times said small time constant.

4. In a feedback control system, according to claim 2, wherein the relative magnitudes of resistance of said first, second, third, and fourth resistors are approximately on the order of 1:7:15:1000, and said first capacitor has a capacitance of approximately twenty times that of said second capacitor.

5. In a feedback control system, according to claim 2, wherein the product of said first resistor and said first capacitor is substantially on the order of at least two times the product of said third resistor and said second capacitor.

6. In a feedback control system, according to claim 5, wherein the resistance of said second resistor is greater than that of said first resistor by a factor of at least two.

References Cited

UNITED STATES PATENTS

| | | | |
|---|---|---|---|
| 3,002,109 | 9/1961 | Baird | 330—28 X |
| 3,098,199 | 7/1963 | Carney et al. | 330—110 X |
| 3,136,940 | 6/1964 | Carlson | 322—28 X |
| 3,193,755 | 7/1965 | Felina | 322—28 |
| 3,241,040 | 3/1966 | Domann | 322—73 X |
| 3,241,082 | 3/1966 | Van Ligten et al. | 330—26 X |
| 3,284,694 | 11/1966 | Roof et al. | 322—28 |

ROY LAKE, *Primary Examiner.*

J. B. MULLINS, *Assistant Examiner.*